United States Patent
Schaefer et al.

(10) Patent No.: US 10,892,581 B2
(45) Date of Patent: *Jan. 12, 2021

(54) FORCE LIMITING LATCH INDICATOR

(71) Applicant: International Business Machines Corporation, Armonk, NY (US)

(72) Inventors: Paul W. Schaefer, Rochester, MN (US); Sandra J. Shirk/Heath, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/410,629

(22) Filed: May 13, 2019

(65) Prior Publication Data

US 2019/0267742 A1  Aug. 29, 2019

Related U.S. Application Data

(63) Continuation of application No. 15/977,674, filed on May 11, 2018, now Pat. No. 10,326,230, which is a
(Continued)

(51) Int. Cl.
*G01L 5/00* (2006.01)
*H01R 13/639* (2006.01)
(Continued)

(52) U.S. Cl.
CPC ............ *H01R 13/465* (2013.01); *G01L 1/225* (2013.01); *G01L 5/00* (2013.01); *G01M 99/007* (2013.01);
(Continued)

(58) Field of Classification Search
None
See application file for complete search history.

(56) References Cited

U.S. PATENT DOCUMENTS

| | | |
|---|---|---|
| 5,336,104 A | 8/1994 | Nagamine |
| 6,212,923 B1 | 4/2001 | Clark |
| | (Continued) | |

OTHER PUBLICATIONS

List of IBM Patents or Patent Applications Treated as Related, Signed May 13, 2019, 2 pages.

*Primary Examiner* — Natalie Huls
*Assistant Examiner* — Jermaine L Jenkins
(74) *Attorney, Agent, or Firm* — Nathan M. Rau

(57) ABSTRACT

A latch indicator apparatus for indicating a locked status of an attachment between a cable housing and a cable receptor. The latch indicator apparatus includes a latch indicator attached to a cable housing at an attachment point, a first resistive element having a first resistance, and is attached to the cable housing at the attachment point. The restive element of the latch indicator attaches to an indicator tab. The latch indicator includes an indicator window, which is positioned to indicate a locked status of the latch indicator based on the first resistance of the first resistive element. The latch indicator tests a connection between a cable housing and a cable housing by indicating a locked status. The locked status is indicated by exerting a first force on the indicator tab by pulling the indicator tab in a direction away from the connection between the cable housing and the cable receptor.

18 Claims, 7 Drawing Sheets

Related U.S. Application Data continuation of application No. 14/965,727, filed on Dec. 10, 2015, now Pat. No. 9,997,861.

(51) Int. Cl.

| | | |
|---|---|---|
| *H01R 24/28* | (2011.01) | |
| *H01R 43/20* | (2006.01) | |
| *H01R 13/46* | (2006.01) | |
| *G01L 1/22* | (2006.01) | |
| *G01M 99/00* | (2011.01) | |
| *H01R 101/00* | (2006.01) | |

(52) U.S. Cl.
CPC ....... *H01R 13/639* (2013.01); *H01R 13/6397* (2013.01); *H01R 24/28* (2013.01); *H01R 43/20* (2013.01); *H01R 2101/00* (2013.01)

(56) References Cited

U.S. PATENT DOCUMENTS

| | | |
|---|---|---|
| 6,315,585 B1 | 11/2001 | Oka |
| 6,325,663 B1 | 12/2001 | Fukuda |
| 6,892,585 B2 | 5/2005 | Clarke |
| 7,134,200 B2 | 11/2006 | Boldy |
| 7,497,477 B2 | 3/2009 | Pepe |
| 7,556,538 B2 | 7/2009 | Nakamura |
| 7,642,465 B2 | 1/2010 | Meyer et al. |
| 7,825,811 B2 | 11/2010 | Chan et al. |
| 7,854,618 B2 | 12/2010 | Liu et al. |
| 8,025,519 B2* | 9/2011 | Handshaw ......... H01R 13/5845 439/352 |
| 8,228,192 B2 | 7/2012 | Eckert et al. |
| 8,360,796 B2 | 1/2013 | Daubigney |
| 8,393,922 B2 | 3/2013 | Bussieres et al. |
| 8,408,948 B2 | 4/2013 | Selvitelli et al. |
| 8,506,319 B2 | 8/2013 | Ritter et al. |
| 8,616,914 B2 | 12/2013 | Mumper et al. |
| 8,769,782 B2 | 7/2014 | Fujikawa |
| 8,773,262 B2* | 7/2014 | Bae .................. E05B 39/00 340/540 |
| 8,960,815 B2 | 2/2015 | Karandikar et al. |
| 9,405,080 B2 | 8/2016 | Lambourn |
| 9,416,569 B1 | 8/2016 | Leone et al. |
| 10,326,230 B2* | 6/2019 | Schaefer ............. H01R 13/639 |
| 2005/0262902 A1 | 12/2005 | Ling et al. |
| 2010/0132418 A1 | 6/2010 | Chen |
| 2010/0225440 A1 | 9/2010 | Maple et al. |
| 2010/0248522 A1 | 9/2010 | Crofoot et al. |
| 2016/0010361 A1 | 1/2016 | Smith et al. |
| 2017/0170595 A1 | 6/2017 | Schaefer et al. |
| 2018/0261948 A1 | 9/2018 | Schaefer et al. |

* cited by examiner

FORCE LIMITING LATCH INDICATOR

BACKGROUND

Aspects of the present disclosure relate to cable connectors, and more particular aspects relate to an indicator for visually determining that a cable connector is properly latched to a receptor.

Indicators may be implemented in hardware connections for visually determining connections between components and cables. Visual indicators may assist in the determination as well as protect the components and cables from damage, which may occur when testing methods include physical pulling or pushing on cables, cable housings, or components.

SUMMARY

According to embodiments of the present disclosure a latch indicator apparatus, a method for testing a latch indicator, and a method for constructing the latch indicator are disclosed. The latch indicator may include an indicator and a resistive element. A force may be exerted on the latch indicator by a user to testing a connection between a cable housing and a cable receptor (also referred to herein as a receptor). The latch indicator may be constructed to be removably attached to the cable housing.

An embodiment directed towards a latch indicator apparatus for indicating a locked status of a connection between a cable housing and a cable receptor. The latch apparatus includes a cable housing, which protects a cable. The latch indicator apparatus includes a latch indicator attached to the cable housing at an attachment point. The latch indicator includes a first resistive element with a first resistance. The first resistive element is attached to the cable housing at the attachment point. The restive element of the latch indicator attaches to an indicator tab. The latch indicator includes an indicator window, which is positioned to indicate a locked status of the latch indicator based on the first resistance of the first resistive element. The latch indicator includes a first resistance of the first resistive element for testing a connection between a cable housing and a cable receptor by indicating a locked status. The locked status is indicated by exerting a first force on the indicator tab by pulling the indicator tab in a direction away from the connection point between the cable housing and the cable receptor.

Another embodiment is directed towards a method for testing a latch indicator. The method includes attaching a latch indicator to a cable housing of a cable. The latch indicator attaches to the cable housing, and determines that the cable housing is connected to the cable receptor. The latch indicator includes a first resistive element with a first resistance, an indicator tab attached to the first resistive element, and an indicator window. The method includes inserting the cable housing into the cable receptor. The method includes testing the latch indicator. The latch indicator is tested by exerting a first force in a direction away from the connection point by pulling the indicator tab wherein the first force overcomes a threshold of the first resistance of the first resistive element to indicate a locked status of the cable housing into the cable receptor. The method includes confirming that the cable housing is connected to the cable receptor.

Yet another embodiment directed towards a method for constructing a latch indicator. The method includes attaching the latch indicator to a cable housing. The latch indicator includes, a tab, a resistive element with a first resistance, and indicator marking, and an attachment point. The method includes attaching the tab to the resistive element. The method includes attaching the resistive element to the cable housing at the attachment point. The method includes positioning the indicator marking to indicate a locked status upon exerting a force overcoming the first resistance of the resistive element.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
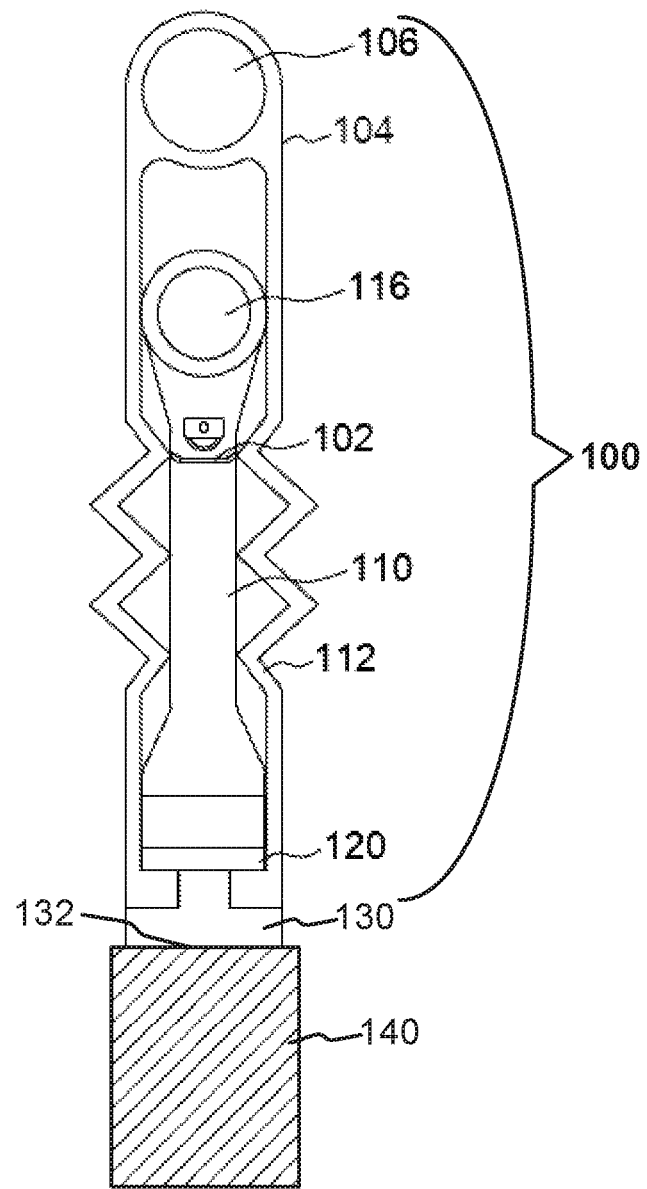
FIG. 1 depicts a latching indicator attached to a cable housing of a cable, according to embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure provide an apparatus of a latch indicator, a method for testing the latch indicator, and a method for adjusting a resistance of a latch indicator. A latch indicator, according to various embodiments, may indicate that the cable including a cable housing is connected to a cable receptor. A latch indicator, according to various embodiments, may include a resistive element, which, when pulled at a desired force, may indicate that the cable housing has been inserted such that the cable is connected to the cable receptor.

A latch indicator may be implemented to determine whether a cable housing and a cable receptor (e.g., a connector) are connected. The cable receptor may be referred to as a receptor, herein. The cable housing may include mechanical latches to connect a cable housing and a receptor. Due to the possibility of restricted sight, audial noise, and/or tester experience, a connection between the cable housing and receptor may be difficult to determine. To ensure that the cable housing and receptor are connected, the latch indicator may be implemented and used to test the connection between the cable housing and receptor. Determining whether the cable housing is connected to the receptor with the latch indicator may improve various methods with a physical indication combined with a visual indicator.

Some existing methods of checking the connection of the cable housing and receptor may be inefficient because they are subjective or situationally not possible. For example, some subjective tests may include pulling on the cable housing, pulling on a handle or tab, pulling on a wire, pulling on a release tab, listening for a latch click, or feeling for a latch click. Subjective tests may not be preferred if an indicator is not present from an operator not knowing how hard to pull may result in an inefficient test, detaching the cable housing from the receptor, or possible damage to the cable, the cable housing, or the receptor. Some situational tests may include visually checking the latch, visually checking an indicator, listening for a latch click, or feeling for a latch click. Situational tests may not be optimal due to possible visual restrictions, environmental noise, or experience of the tester, among other reasons.

The resistive element of the latch indicator may resist a force from a tester and when pulled at a desired force may indicate that the cable housing is connected to a receptor. The tester, for example, may be a machine or a user. The tester may provide an exerted force in the direction away from the connection point of the cable housing and the receptor to determine if the cable housing is connected to the receptor. The resistive element may be set to a resistance such that under normal conditions the cable housing may not be removed from the receptor without an external force. If the user is able to pull the latch indicator to an indicator window, overcoming the resistive element such that the latch indicator indicates that the cable housing is locked with the receptor, then the connection may be determined and/or identified to be locked.

The receptor may be a component of a computing system. The receptor may be a female connector configured to attach (connect) to a male connector of a cable, which may be a cable housing. In various embodiments, the cable housing may be a female connector and the receptor may be a male connector. The cable housing may be inserted into the receptor and considered connected when a force at or greater than a connection force is generated on the connection. For example, a connection force may be based on 50% of the force to detach the cable housing (detachment force) from the receptor. If the detachment force is 20N (Newtons), then the connection force may be 10N. A user may pull the latch indicator with 10N of force and upon reaching 10N of force the latch indicator may indicate with the indicator window that the cable housing is locked and connected to the receptor. A breaking force may be set at 50-75% of the detachment force. For example, if the detachment force is 20N then the breaking force may be 15N. A user may pull the latch indicator with 15N of force and upon reaching 15N of force the latch indicator may break.

In various embodiments, the cable housing and the receptor may connect to each other and be held in place with a frictional force (e.g., static frictional force). The frictional force may be measured and used to set a resistance of the resistive element such that the exertion of force in the direction away from the connection between the cable housing and the receptor is below the frictional force. For example, an increased frictional force may include ridges on the exterior of the cable housing and the interior of the receptor to lock the cable housing to the receptor.

In various embodiments, the cable housing and the receptor may include a lock, which keeps the cable housing and receptor connected. For example, the lock may be a pin and hole lock, which when the cable housing and the receptor are connected, a pin on the cable housing is extended into the hole on the receptor locking the cable housing and receptor connected. The pin may be spring-actuated such that when a force is not exerted on the pin, the pin extends to fill the area in the extension of the pin.

In FIG. 1, a latch indicator is illustrated as attached to a cable housing of a cable, according to embodiments. A latch indicator 100 may be attached to the cable housing 130 at an attachment point 120. The latch indicator 100 may include a resistive element 112, which resists a force exerted on the latch indicator 100. The latch indicator 100 may include an indicator tab (tab) 104 with a tab hole 106, which if the tester is a person, the user may insert a finger into the hole to exert the force upon the latch indicator to determine if the cable housing 130 is connected to a cable receptor 140. The indicator tab 104 of the latch indicator 100 may be a handle, which a user may grasp or insert a finger into the tab hole 106 to exert force upon to test the connection of the cable housing 130 and receptor 140. The attachment point 120 of the latch indicator 100 may be between the cable housing 130 and a handle 110. The latch indicator may include the handle 110 with an indicator window 102 and a handle hole 116. The indicator window 102 may indicate that the cable housing 130 is connected to the cable receptor. The handle hole 116 of the handle 110 may be grasped by a user and may be directly attached to the cable housing 130 such that a force exerted on the handle 110 may detach the cable housing 130 from the receptor 140. The latch indicator 100, including the resistive element 112, may be removably attached to the handle 110, the cable receptor 130, or both.

Testing of the latch indicator 100 may include exerting a force on the tab 104 of the latch indicator in a direction away from the connection point 132 of the cable housing 130 and receptor 140, may be used to determine if the cable housing and receptor are connected. The tab 104 of the latch indicator 100 may be attached to a resistive element 112, which attaches the latch indicator to the cable housing 130 at the attachment point 120. When a force is exerted upon the tab 104 of the latch indicator 100, the latch indicator may transmit the force through the resistive element 112 into to the cable housing 130, such that any force exerted on the handle 104 of the latch indicator may be the same or substantially similar to a force exerted directly on the cable housing. The cable housing 130 may receive the force exerted on the latch indicator wherein the force may be transmitted to the connection between the cable housing and receptor 140. For example, a 10N force exerted on the tab 104 of the latch indicator 100 may be transmitted to the resistive element 112, which may draw back the resistive element. The drawing back of the resistive element 112 may exert the 10N force on the attachment point 120 between the resistive element 112 and the cable housing 130. The cable housing 130 may be pulled at the 10N of force, which may result in the cable housing 130 either detaching from the receptor 140 or staying connected to the receptor 140.

In various embodiments, the removable attachment of the latch indicator 100 may include a snap-in-place attachment point 120. The latch indicator 100 may be snapped into place and held into place between the handle 110 and the cable housing 130. For example, the latch indicator 100 may be flexible plastic. The flexible plastic may allow the latch indicator 100 to be expanded and snapped into place at the attachment point 120.

In various embodiments, the removable attachment of the latch indicator may include a mechanical attachment, for example at attachment point. The mechanical attachment of the latch indicator may include one or more mechanical means of attachment. For example, a mechanical attachment may include a screw, a bolt, or an equivalent fastening device for attaching the indicator to the handle, the cable housing, or both the handle and the cable housing at attachment point.

The handle 110 may be used to disconnect the cable housing 130 from the receptor 140. The handle 110 may be directly attached to the cable housing 130 or attached such that a force exerted on the handle 110 may overcome the connection at connection point 132 of the cable housing 130 and receptor 140. The handle 110 may be used for disconnecting the cable housing 130 from the receptor 140 before or after testing the latch indicator 100. The detachment may include a user inserting a finger into the handle hole 116 of the handle 110 and exerting a force in a direction away from the insertion of the cable housing 120 and receptor 140.

Figure 2:
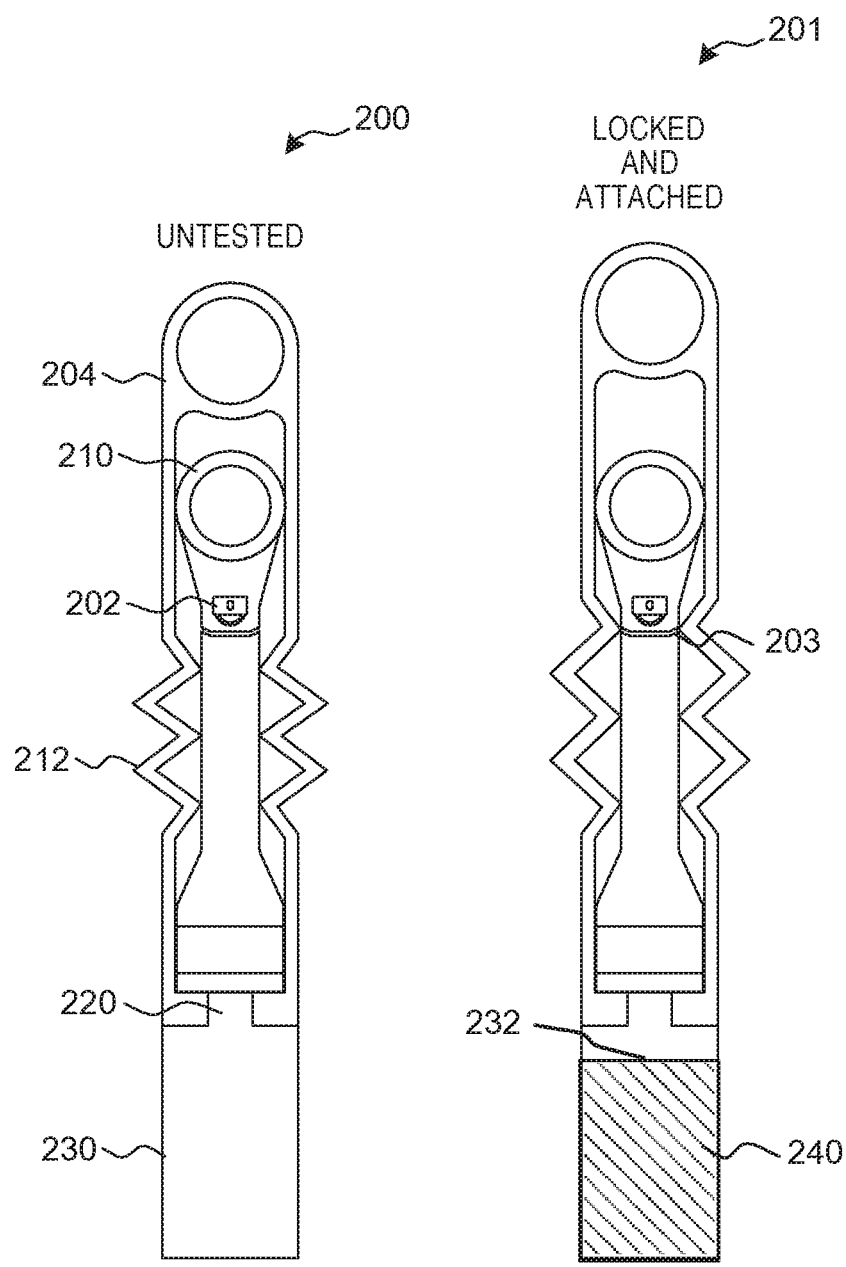
FIG. 2A depicts an untested latch indicator, according to embodiments of the present disclosure.
FIG. 2B depicts a tested latch indicator indicating a locked and attached cable, according to embodiments of the present disclosure.

In FIG. 2A, an untested latch indicator is illustrated, according to embodiments. The latch indicator 200 currently illustrates an untested (non-locked) cable housing and receptor connection. A non-locked cable housing 230 connection, for example, may include a cable housing not connected to the receptor, an untested latch indicator 200, or an improper cable housing 230 to receptor connection.

The latch indicator 200 in the untested indication may include the cable housing 230 connected to the receptor (e.g., 140 of FIG. 1) but not yet tested. If the cable housing 230 is connected to the receptor but not yet tested then the cable housing may not be determined as connected to the receptor. If the cable housing 230 has not been determined as connected to the receptor, then the latch indicator may be required to be tested before ensuring the connection. For example, the cable housing may be inserted into the receptor. Until the latch indicator 200 is tested, the inserting of the cable housing into the receptor may not be determined as connected.

The latch indicator 200 in the untested indication may include the cable housing 230 previously attached to the cable housing 230, but becoming detached upon the testing of the latch indicator 200. The connection may be tested by the latch indicator 200, but during the test, the cable housing 230 may be removed from the receptor, since the cable housing was removed, the latch indicator 200 may indicate that the cable was not connected to the receptor. For example, the cable housing 230 may be inserted into the receptor, and the latch indicator 200 tested by pulling the tab 204 including a resistive element 212 with a 10N resistance. The test includes a user exerting a force on the latch indicator 200 away from the connection point (e.g. 132 of FIG. 1) of the cable housing 230 and receptor. The cable housing 230 may be pulled out from the receptor at a force below 10N, before an indication by the latch indicator 200 that the cable housing 230 is connected to the receptor, indicates that the cable housing and receptor either are (or were) not connected.

In FIG. 2B, a tested latch indicator indicates a locked and attached cable housing and receptor, according to embodiments of the present disclosure. The locked and attached (connected) latch indicator 201 may be the same or substantially similar to the latch indicator 200 in FIG. 2A after a test is performed. The locked and attached latch indicator 201 may have been tested to determine that the cable housing is attached to a receptor 240. The cable housing may be inserted into the cable receptor 240 at a connection point 232. The connection point 232 may include friction between the cable housing (230 of FIG. 2A) and cable receptor 240, which may result in a determination of the resistance of the resistive element. The tab of the locked and attached latch indicator 201 may have been pulled with a force in a direction away from the connection point 232 of the cable housing and the receptor 240.

The locked and attached latch indicator 201 may be determined to be indicating a locked and attached latch indication (indicator window) 203 printed on a handle for determining a locked status (connected). When the resistive element reaches the indicator window 203, the latch indicator 201 may be determined to be locked and attached 201. In various embodiments, instead of the resistive element reaching the locked indicator window 203 a second indicator marking such as a line or an image may be drawn or attached to the latch indicator 201 or resistive element.

The resistive element may be used to indicate that the cable housing is attached to the receptor 240 with the indicator window 203. The resistive element may be set at a first resistance for testing the attachment between the cable housing and the receptor 240. Upon receiving a sufficient exerted force set at the first resistance of the resistive element, the latch indicator 201 may indicate with the indicator window 203 a locked status, where the cable housing and the receptor 240 are connected. For example, the resistive element may be set at 10N to indicate that a cable housing is connected to a receptor 240. Upon reaching the sufficient exerted force of 10N of force exerted on the latch indicator 201, which translates the 10N of force through the resistive element to the cable housing, the latch indicator may indicate an indicator window 203 of the connection of the cable housing and the receptor 240.

In various embodiments, an exerted force below the force of the first resistance of the resistive element may result in the latch indicator not indicating the locked and attached indicator window. Until receiving the sufficient exerted force set at the first resistance of the resistive element, the latch indicator may indicate the untested indication (FIG. 2A) indicator window. The untested indication may also include the detachment of the cable housing from the cable receptor 240.

In various embodiments, a first latch indicator with a first resistive element including first resistance may be interchangeably substituted for a second latch indicator with a second resistive element with a second resistance. According to various embodiments, the second latch indicator may function similarly to the first latch indicator, but may include a different resistance. To increase or decrease the force required to determine if the cable housing is connected to the receptor, the resistance may be increased or decreased, respectively. For example, if the cable housing and receptor connection requires a lower sufficient force to test the connection, then the first latch indicator may be substituted for a second latch indicator.

In various embodiments, receiving an exerted force above the force of the first resistance of the resistive element may result in the first latch indicator indicating greater than the locked and attached status. When the locked and attached status is exceeded, the first latch indicator may be constructed to disconnect from the cable hosing (further described in FIG. 3) or break (further described in FIG. 4) to protect the cable housing. Exceeding the force above the first resistance is described further herein.

Figure 3:
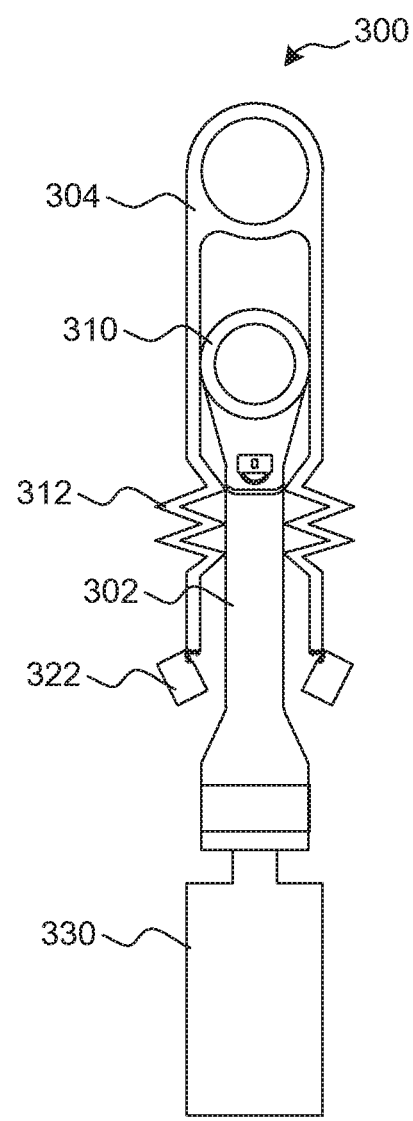
FIG. 3 depicts a latch indicator breaking at the attachment point of the cable housing, according to embodiments of the present disclosure.

In FIG. 3, a latch indicator breaking is illustrated at an attachment point of the cable housing, according to embodiments. Upon an exertion of force greater than a first resistance of a resistive element 312, the latch indicator may break 322 from the previous attachment point (120 of FIG. 1).

Damage to the cable housing 330 or the receptor may result from an excessive force being exerted on the latch indicator 300. To prevent the cable housing 330 or the receptor from being damaged, the latch indicator 300 may be constructed to break 322 or detach from the cable housing at a force threshold of the exerted force. For example, the latch indicator 300 may break 322 upon a force of 15N being generated upon the latch indicator. According to one embodiment, the generation of the force may proceed as follows: a user may pull on the tab 304 of the latch indicator 300 in a direction away from the connection of the cable housing 330 and receptor at a force of 10N the latch indicator may indicate a connection between the cable housing and receptor, at a force of 15N the latch indicator may break 322 from the cable housing.

The force threshold may be set as a range of exerted force to indicate that the cable housing 330 is connected to the receptor. The set range may start at the force required to indicate that the cable housing 330 is connected to the receptor, and end at the force generated to break 322 (breaking force) the latch indicator 300. For example, the set range may start at 10N (force required to indicate connection) and end at 15N (force generated to break the latch indicator). If the force generated on the latch indicator 300 is 9N, then the latch indicator may not indicate that the cable housing 330 is connected to the receptor. If the force generated on the latch indicator 300 is 16N, then the latch indicator may break 322.

If the latch indicator 300 is not constructed to break 322 then the cable housing 330 may be removed from the receptor. Depending on a constructed breaking force, the cable housing 330 or receptor may be damaged when the cable housing is removed from the receptor. For example, a force greater than 16N may result in the cable housing 330 being forcibly removed from the receptor, the forcible removing of the cable housing may result in damaging the receptor. If the latch indicator 300 breaks 322 from the cable housing 330 then a new indicator 300 may be attached to the cable housing after an inspection of the cable housing and receptor, or a new or different cable and/or cable housing with and indicator may be subsisted.

According to various embodiments, a constructed breaking force may be 15N. The constructed breaking force of 15N may be above a test connection force of 10N, but below a detachment force of 20N (at which point cable housing and receptor would be forcibly disconnected), at which the cable housing 330 may break 322 or detach from the receptor, which may protect the connection between the cable housing and receptor. Protecting the connection may be advantageous to reduce damage to the cable housing 330 and/or the receptor. By protecting the connection, the cable housing 330 may remain connected to the receptor, if the latch indicator 300 indicated the connection (locked and attached status 201 of FIG. 2B), but may be removed to inspect the cable housing 330 and receptor.

In an additional example, if the constructed breaking force is 21N, which is above a test connection force of 10N and a detachment force of 20N, then the breaking force may protect the cable when the disconnection force is exceeded. Protecting the connection when the detachment force is exceeded may be advantageous if the connection of the cable housing 330 and the receptor is incorrect, stuck together, or to prevent an incorrect test. If the connection of the cable housing 330 and receptor is incorrect, then they may be position such that a force greater than the detachment force may damage the cable housing or the receptor. If the connection of the cable housing and receptor are stuck together, then the detachment force may not be enough to result in detachment and a more analytical detachment approach may be necessary. To prevent the incorrect test, the breaking force may occur if the test is performed too quickly or in a jerky motion, which may not properly indicate the result of the test or cause damage to the connection of the cable housing 330 and the receptor, or to a component that includes the receptor.

In various embodiments, the latch indicator may be deliberately breakable (e.g., detachable). To determine if the cable housing is connected to the cable receptor the latch indicator may be configured to break upon an exertion of force. Breaking the latch indicator may indicate that the cable housing is connected to the cable receptor. For example, the cable housing and receptor may include a pin lock, and exerting a force above the resistance of the resistive element may cause damage to the cable housing or receptor. A breaking force of the latch indicator may be set at a 10N resistance, and upon reaching the 10N force, the latch indicator may break, indicating that the cable housing is connected to the receptor.

In various embodiments, the latch indicator may detach from the cable housing instead of breaking from previous connection point of the cable housing. For example, the latch indicator may be detachable and include a force determinative connection points. Upon a force threshold of a determined force, the connection points of the latch indicator may detach from the cable housing. For example, the latch indicator may include the force determinative connections that may disconnect from the cable housing at a force of 15N. If a user exceeds 15N of force, then the force determinative connection may disconnect from the cable housing 330 to protect the cable housing or receptor from being damaged.

Figure 4:
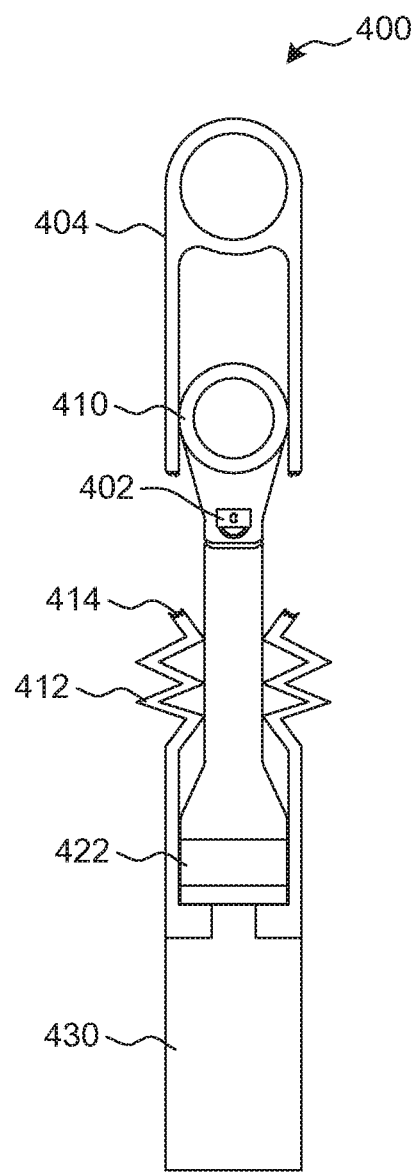
FIG. 4 depicts a broken latch indicator, according to embodiments of the present disclosure.

In FIG. 4, a broken latch indicator 400 is illustrated, according to embodiments. Similar to FIG. 3, a tab 404 of the latch indicator 400 may break 414 or detach at the attachment between the tab and a resistive element 412. The tab 404 of the latch indicator 400 may detach from the resistive element 412 at break 414, wherein the resistive element may remain attached to a cable housing 430 or handle 410 at an attachment point 422.

The breaking of the tab 404 of the latch indicator 400 may occur upon an excess of force exerted on the latch indicator. For example, force exerted on the tab 404 may draw the resistive element 412 past the indicator window 402 causing the tab 404 to break 414 from resistive element of the latch indicator. The broken latch indicator 400 may be replaced and the cable housing and receptor may be inspected before testing with a replacement latch indicator.

Figure 5:
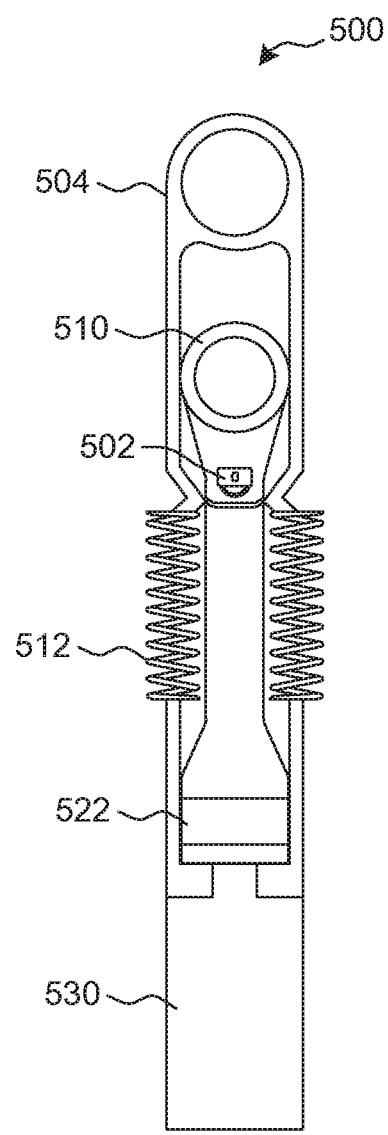
FIG. 5 depicts a latch indicator with coil springs as resistive elements, according to embodiments of the present disclosure.

In FIG. 5, a latch indicator with coil springs as resistive elements is illustrated, according to embodiments. A latch indicator 500 may be constructed such that the resistive element is a spring 512. The spring 512 as a resistive element may include a tension spring, a torsion spring, a compression spring, and/or other equivalent spring. The spring 512 may be attached to the tab 504 of the latch indicator 500. The spring 512 may be a constant rate spring or a variable rate spring depending on the construction of the latch indicator 500. The latch indicator 500 may be attached to the spring 512 that attaches to the cable housing 530 and/or a handle 510 at an attachment point 522. The spring 512 may be constructed to have a first resistance such that when a force is exerted on the spring through the latch indicator 500, the latch indicator may reach the indicator window 502 confirming that the cable housing 530 is connected to a receptor.

The spring 512 as a resistive element may be attached to the tab 504 of the latch indicator 500 such that a force upon the spring in the direction away from the attachment point 522 will be resisted by the spring 512. The spring 512 may have a first resistance that when constructing the latch indicator 500 results in the indicator marking 502 being at a desired force. For example, the spring 512 may be a tension spring, and the bottom of the spring 512 may connect to the attachment point 522 of the cable housing 530.

In various embodiments, a spring 512 with a first resistance may be interchangeably substituted for a second spring with a second resistance. To increase or decrease the force required to determine if the cable housing 530 is connected to the receptor, a first spring 512 with a first resistance may be substituted for a second spring with an increased or decreased resistance respectively. For example, if the cable housing and receptor connection requires a lower force of 10N from the original 15N to test the connection, then a first spring 512 with a resistance of 15N may be substituted for a second spring with a lower resistance of 10N.

Figure 6:
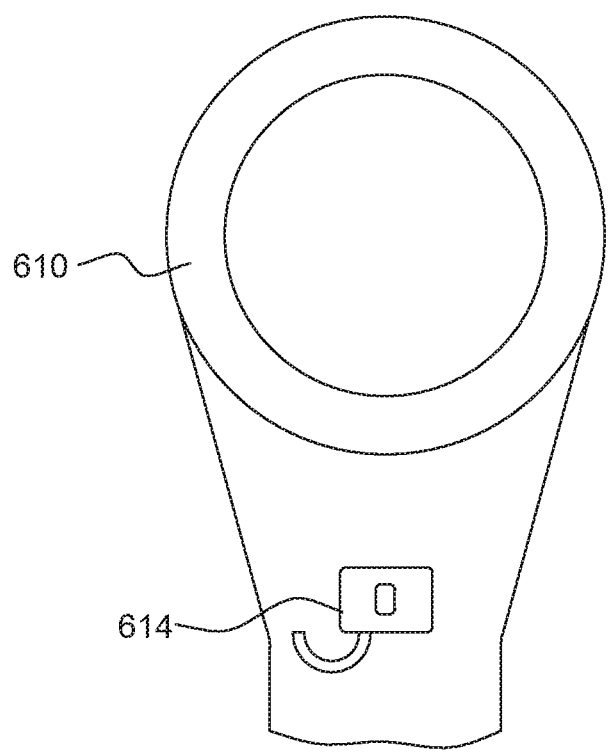
FIG. 6 depicts a handle indicating a cable release graphic, according to embodiments of the present disclosure.

In FIG. 6, a cutaway view of a handle indicating a cable release graphic is illustrated, according to embodiments. A handle 610 may also include a cable release graphic 614. The cable release graphic 614 may illustrate to a user that the cable housing may be removed and/or detached from the receptor by pulling on the handle 610 and not the latch indicator. The handle 610 may be used to connect and/or disconnect the cable housing from the receptor. The handle 610 may include a hole as to which a user may insert a finger or grabbing or clamping device to assist in pulling the handle.

Figure 7:
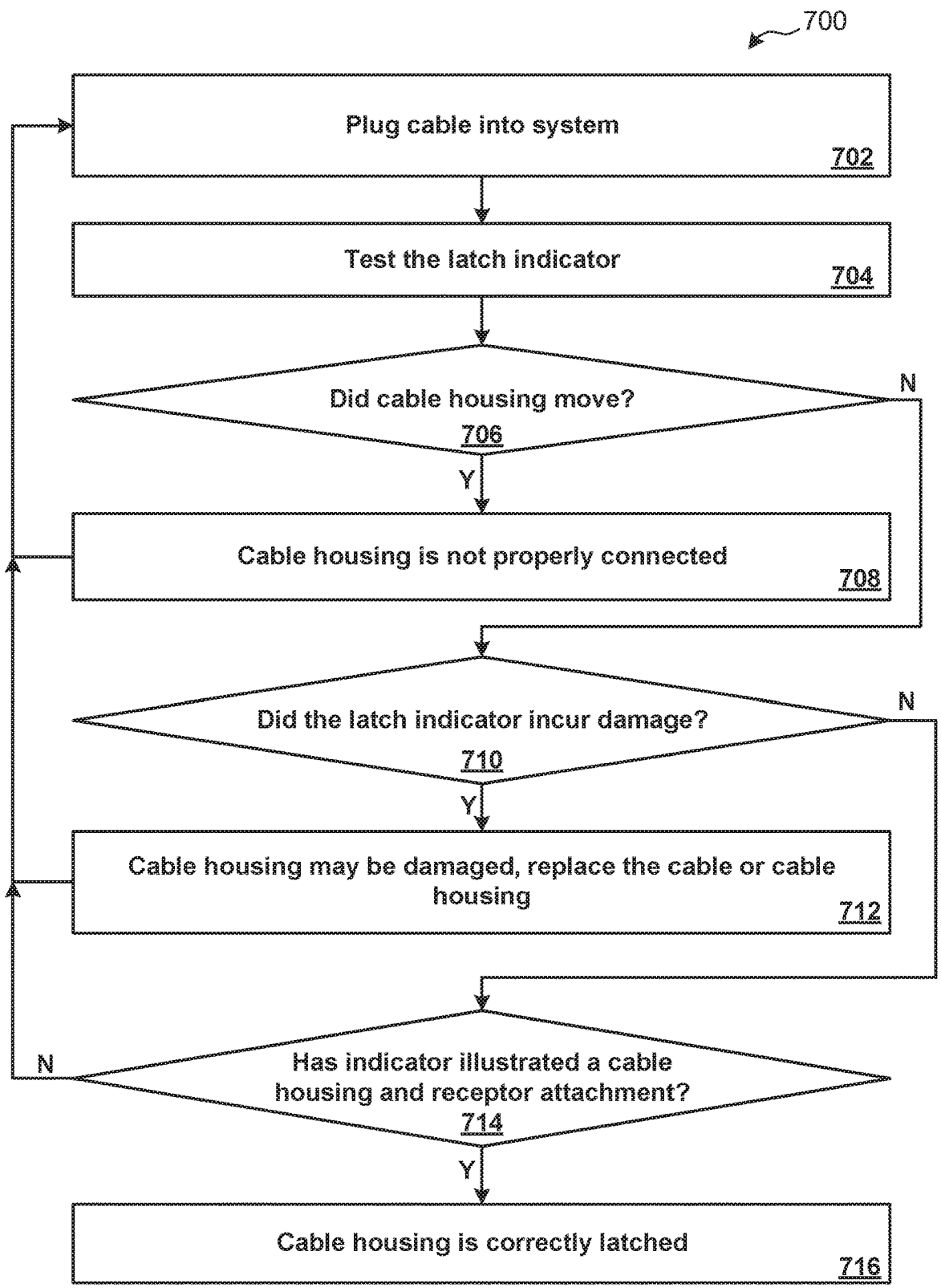
FIG. 7 is a flowchart instructing a cable check method, according to embodiments of the present disclosure.

In FIG. 7, a flowchart instructing a cable check method 700 is illustrated, according to embodiments. The method 700 may illustrate one process of determining if a cable housing is connected to a receptor. In various embodiments, the method 700 of the determination of the connection between the cable housing and receptor may include rearranging the flowchart to better suit the testing needs.

In operation 702, the cable may be plugged into a system. Plugging the cable in may include inserting a cable housing into a receptor. The cable housing may include a latch indicator for determining if the cable housing is connected to the receptor. The latch indicator may be attached to the cable housing and used to test the connection.

In operation 704, a tester may use the latch indicator to test the connection between the cable housing and receptor. A user may pull on the latch indicator in a direction away from a connection point between the cable housing and receptor. The testing of the latch indicator may depend on the type of latch indicator and the force required in testing the latch indicator.

In operation 706, after testing the latch indicator at operation 704, the tester may determine if the cable housing has moved. Movement of the cable housing may include the cable housing disconnecting from the receptor, or the cable housing changing location or orientation when inserted into the receptor. For example, if a user tests the latch indicator and the cable housing moves toward the user 2 cm (centimeters) then the cable housing may have moved and may be considered disconnected from the receptor. If the cable housing moves during the testing operation, then the method 700 may progress to operation 708. In another example, if a user tests the latch indicator and the cable housing does not move, than the cable housing may be considered to be connected. If the cable housing does not move during the testing operation, then the method 700 may progress to operation 710.

In operation 708, the cable housing may be determined to not be properly connected to the receptor. If the cable housing is not properly connected to the receptor, then the method 700 may return to the beginning at operation 702. When returning to the beginning the cable housing may be disconnected from the receptor, inspected, and then reconnected in operation 702.

In operation 710, the latch indicator may be inspected for damage incurred during the testing from operation 704. If the latch indicator experienced excessive force during testing, then the latch indicator may have broken which may result in damage to the cable housing and/or the receptor. If the latch indicator has been damaged, then the method 700 may progress to operation 712. If the latch indicator has not been damaged, then the method 700 may progress to operation 714.

In operation 712, the latch indicator may have been damaged and may require replacement before a determination may be made of the connection between of the cable housing and the receptor. The latch indicator may be replaced after breaking. For example, the replacement of the latch indicator may include removing the indicator or pieces of the indicator still attached to the handle or cable housing, removing any mechanical attachments, and reattaching a new latch indicator to the handle or cable housing with new mechanical attachments. In various embodiments, the cable housing, cable, or receptor may need to be replaced after an inspection. After replacing any damaged components, the method 700 may return to operation 702 and may restart.

In operation 714, the testing of the latch indicator determines if the cable housing is connected to the receptor. When testing the latch indicator an indicator window may be used to determine if the cable housing is connected to the receptor. If the indicator window is illustrated during testing, then the cable housing may be determined as connected to the receptor. If the cable housing is determined as connected to the receptor, then the method 700 may progress to operation 716. If the cable housing is determined as not connected to the cable receptor, then the method 700 may return and restart again at operation 702.

In operation 716, the cable housing may be determined to be connected to the receptor. The cable housing may be connected to the receptor if the cable housing is determined to not have moved, did not incur damage, and the indicator window has indicated a connection. If the cable housing is considered as connected to the receptor then the cable may remained plugged in and used for an intended purpose.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A latch indicator comprising:
a cable housing that protects a cable; and
a latch indicator removably attached to the cable housing at an attachment point, wherein the latch indicator includes:
a first resistive element having a first resistance attached to the cable housing at the attachment point,
an indicator tab attached to the resistive element, and
an indicator window positioned to indicate a locked status of a connection between the cable housing of the latch indicator based on the first resistance;
a second resistive element having a second resistance that is interchangeably substituted with the first resistive element having a first resistance; and
the first resistance of the first resistive element for testing the connection between a cable housing and a cable receptor to indicate a locked status by:
receiving an exerted first force on the indicator tab, wherein the exerted first force includes a pulling of the indicator tab in a direction away from the connection between the cable housing and cable receptor.

2. The latch indicator apparatus of claim 1, further comprising:
a handle attached to the cable housing at the attachment point.

3. The latch indicator apparatus of claim 1, wherein the first resistance is based on a friction of a connection between the cable housing and a cable receptor.

4. The latch indicator apparatus of claim 1, wherein the first force is not sufficient to overcome the first resistance causing the indicator window to not indicate the locked status.

5. The latch indicator apparatus of claim 1, wherein the first force is sufficient to reach a force threshold of the first resistance causing the latch indicator to indicate the locked status.

6. The latch indicator apparatus of claim 5, wherein the indicator is constructed to detach from the cable housing in response to an exerted force greater than the first resistance.

7. A method for testing a latch indicator, the method comprising:
attaching a latch indicator to a cable housing of a cable at an attachment point, wherein the latch indicator is removably attached to the cable housing, wherein the latch indicator:
includes a first resistive element having a first resistance, an indicator tab attached to the resistive element, an indicator window, and a second resistive element having a second resistance interchangeable with the first resistive element,
connects to the cable housing to a cable receptor at a connection point, and determines that the cable housing is connected to the cable receptor;
inserting the cable housing into the cable receptor at the connection point;
testing the latch indicator by:
receiving an exerted first force on the indicator tab, wherein the exerted first force includes a pulling of the indicator tab, wherein the first force overcomes a threshold of the first resistance of the first resistive element to indicate a locked status of the cable housing and cable receptor with the indicator window; and
confirming, in response to testing, that the cable housing is connected to the cable receptor.

8. The method of claim 7, further comprising:
determining that the cable housing is not connected to the cable receptor by:
exerting a second force on the indicator tab wherein the second force does not overcome the threshold of the first resistance of the first resistive element.

9. The method of claim 8, wherein the second force exerted on the indicator tab causes the cable housing to be disconnected from the cable receptor at the connection point.

10. The method of claim 7, further comprising:
determining a breaking force of the latch indicator causing the latch indicator to break upon exerting a force greater than the first force.

11. The method of claim 7, further comprising:
determining that the cable housing did not move.

12. The method of claim 7, further comprising:
determining that the latch indicator did not incur damage.

13. The method of claim 7, further comprising:
determining that the latch indicator has indicated a connection.

14. A method for constructing a latch indicator, the method comprising:
attaching a latch indicator to a cable housing, the latch indicator including:
an indicator tab,
a resistive element having a first resistance,
a second resistive element having a second resistance, the second resistive element interchangeable with the resistive element;
an indicator marking, and
an attachment point
attaching the tab to the resistive element;
attaching the resistive element to the cable housing at the attachment point; and
positioning the indicator marking to indicate, that upon exerting a force at the first resistance of the resistive element, a locked status.

15. The method of claim 14, wherein a handle is attached to the cable housing at the attachment point.

16. The method of claim 14, wherein the latch indicator is removably attached to the cable housing.

17. The method of claim 16, wherein a removable attachment of the latch indicator includes mechanical attachment.

18. The method of claim 16, wherein a removable attachment of the latch indicator includes a snap-in-place attachment point on the cable housing.

* * * * *